(12) United States Patent
Deutsch et al.

(10) Patent No.: US 9,841,098 B2
(45) Date of Patent: Dec. 12, 2017

(54) TRANSMISSION WITH FLUID DISTRIBUTING CLUTCH HUB

(71) Applicant: Ford Global Technologies, LLC, Dearborn, MI (US)

(72) Inventors: Laurence Andrew Deutsch, Farmington Hills, MI (US); Gregory Daniel Goleski, Rochester Hills, MI (US); Mark Vaughn Smearsoll, West Chester, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 14/867,414

(22) Filed: Sep. 28, 2015

(65) Prior Publication Data

US 2017/0089452 A1    Mar. 30, 2017

(51) Int. Cl.
| | |
|---|---|
| *F16H 57/04* | (2010.01) |
| *F16D 13/52* | (2006.01) |
| *F16D 13/64* | (2006.01) |
| *F16D 13/68* | (2006.01) |
| *F16D 13/72* | (2006.01) |
| *F16D 13/74* | (2006.01) |
| *F16H 3/66* | (2006.01) |
| *F16H 57/08* | (2006.01) |

(52) U.S. Cl.
CPC ......... *F16H 57/0473* (2013.01); *F16D 13/52* (2013.01); *F16D 13/644* (2013.01); *F16D 13/648* (2013.01); *F16D 13/683* (2013.01); *F16D 13/72* (2013.01); *F16D 13/74* (2013.01); *F16H 3/66* (2013.01); *F16H 57/043* (2013.01); *F16H 57/0427* (2013.01); *F16H 57/0484* (2013.01); *F16H 57/08* (2013.01); *F16H 2057/087* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 5,423,406 A | 6/1995 | Antonov | |
| 8,641,574 B2 | 2/2014 | Janson | |
| 2004/0045389 A1* | 3/2004 | Pascoe | F16H 55/17 74/434 |
| 2005/0209038 A1* | 9/2005 | Kempf | B60K 6/36 475/159 |
| 2008/0220928 A1* | 9/2008 | Nishida | F16H 3/663 475/275 |

(Continued)

*Primary Examiner* — Justin Holmes
(74) *Attorney, Agent, or Firm* — James Dottavio; Brooks Kushman P.C.

(57) ABSTRACT

A clutch hub is splined to a planetary ring gear and a second rotating element, coupling the two elements. The spline defines a number of axial fluid distribution channels that conduct fluid from an interior radial passageway beside the ring gear to exterior radial passageways over the ring gear. These axial passageways permit packaging the clutch pack directly over the ring gear without drilling holes in the hardened gear material. The axial channels may be defined by radial space between the splined components. Alternatively or additionally, some spline teeth may be omitted to define larger axial channels.

13 Claims, 3 Drawing Sheets

(56) References Cited

U.S. PATENT DOCUMENTS

2013/0174407 A1\* 7/2013 Dziurda .................. F16D 1/02
　　　　　　　　　　　　　　　　　　　　　29/525.01
2014/0087910 A1　　3/2014 Thomas et al.
2014/0378265 A1　12/2014 Goleski et al.
2015/0323060 A1\* 11/2015 Torii ...................... F16H 57/08
　　　　　　　　　　　　　　　　　　　　　475/116

\* cited by examiner

TRANSMISSION WITH FLUID DISTRIBUTING CLUTCH HUB

TECHNICAL FIELD

This disclosure relates to the field of transmissions for motor vehicles. More particularly, the disclosure pertains to a transmission having a clutch hub splined to a ring gear to create an axial fluid distribution channel.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many transmissions utilize friction clutches and brakes which are engaged in different combinations to establish different power flow paths having different speed ratios. One type of commonly used friction clutch is a wet multi-plate clutch. A clutch pack includes a set of friction plates splined to one component and interleaved with a set of separator plates splined to a different component. To engage the clutch, pressurized fluid is supplied to an apply chamber forcing a piston to squeeze the friction plates between the separator plates. Friction between the friction plates and separator plates prevents relative rotation coupling the two components to each other. When the fluid pressure is reduced, a return spring forces the piston away from the clutch pack removing the normal force such that relative rotation is possible with minimal drag. Wet multi-plate clutches rely on a supply of transmission fluid to the friction material on the friction plates. This fluid serves several purposes, including modifying the friction characteristics of the material and removing excess heat.

SUMMARY OF THE DISCLOSURE

A transmission includes a planetary gearset ring gear, a clutch hub, and a plurality of friction plates. The clutch hub has internal and external spline teeth. The internal spline teeth engage with ring gear spline teeth to define a plurality of axial distribution channels. The clutch hub further defines one or more radial channels extending outwardly from the axial channels. The friction plates are axially aligned with the ring gear. The clutch hub may be closed on one end to define one end of the fluid distribution channels. A snap ring may be inserted into a groove of the clutch hub to define an end of the axial distribution channels. A rotating shaft may also be splined to the clutch hub. The space between the rotating shaft and the ring gear may define a radial fluid flow channel extending inwardly from the axial channels. The axial channels may be defined between an inner diameter of the ring gear spline teeth and an outer diameter of the clutch hub internal spline teeth. Alternatively or additionally, some internal spline teeth may be omitted to define axial fluid flow channels.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
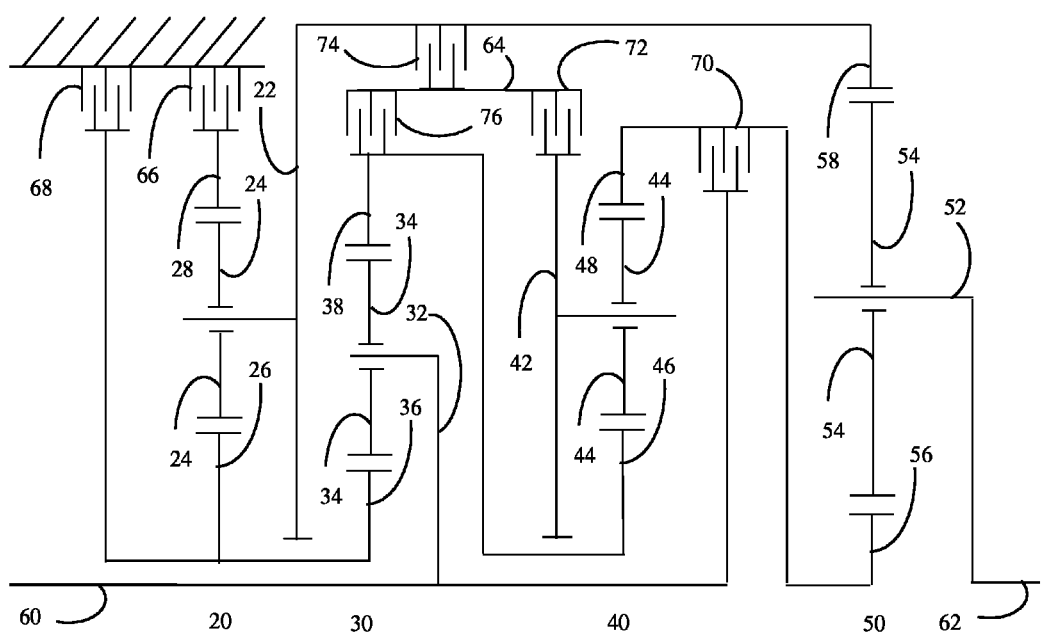
FIG. 1 is a schematic representation of a transmission kinematic arrangement.

FIG. 1 illustrates a kinematic arrangement for a 10 speed automatic transmission. Four simple planetary gear sets 20, 30, 40, and 50 each have a carrier supporting a set of planet gears with each planet gear meshing with a sun gear and a ring gear. Sun gears 26 and 36 are fixedly coupled. Carrier 22 is fixedly coupled to ring gear 58, Ring gear 38 is fixedly coupled to sun gear 46. Ring gear 48 is fixedly coupled to sun gear 56. Input 60 is fixedly coupled to carrier 32. Output 62 is fixedly coupled to carrier 62. Brake 66 selectively holds ring gear 28 against rotation. Brake 68 selectively holds sun gears 26 and 36 against rotation. Clutch 70 selectively couples input 60 and carrier 32 to ring gear 48 and sun gear 56. Intermediate shaft 64 is selectively coupled to carrier 42 by clutch 72, selectively coupled to carrier 22 and ring gear 58 by clutch 74, and selectively coupled to ring gear 38 and sun gear 46 by clutch 76.

In order to minimize the overall length and diameter of the transmission, it is desirable to nest components closely whenever possible, as long as the nesting does not interfere with component function. Specifically, it is desirable to locate the friction plates and separator plates of clutch 76 radially outside ring gear 38 and at the same axial position. Conventionally, fluid is directed into a space on the radial interior side of a clutch hub from which centrifugal force pushes the fluid through radial holes in the clutch hub to lubricate and cool the clutch pack. However, when a clutch pack is located adjacent to and radially outside a ring gear, the space is occupied by a solid ring gear. Drilling diagonal holes through the ring gear is difficult because the ring gear is made of hardened material for strength. Consequently, it is sometimes necessary to offset the clutch pack axially from the ring gear which may increase the overall length of the transmission.

Figure 2:
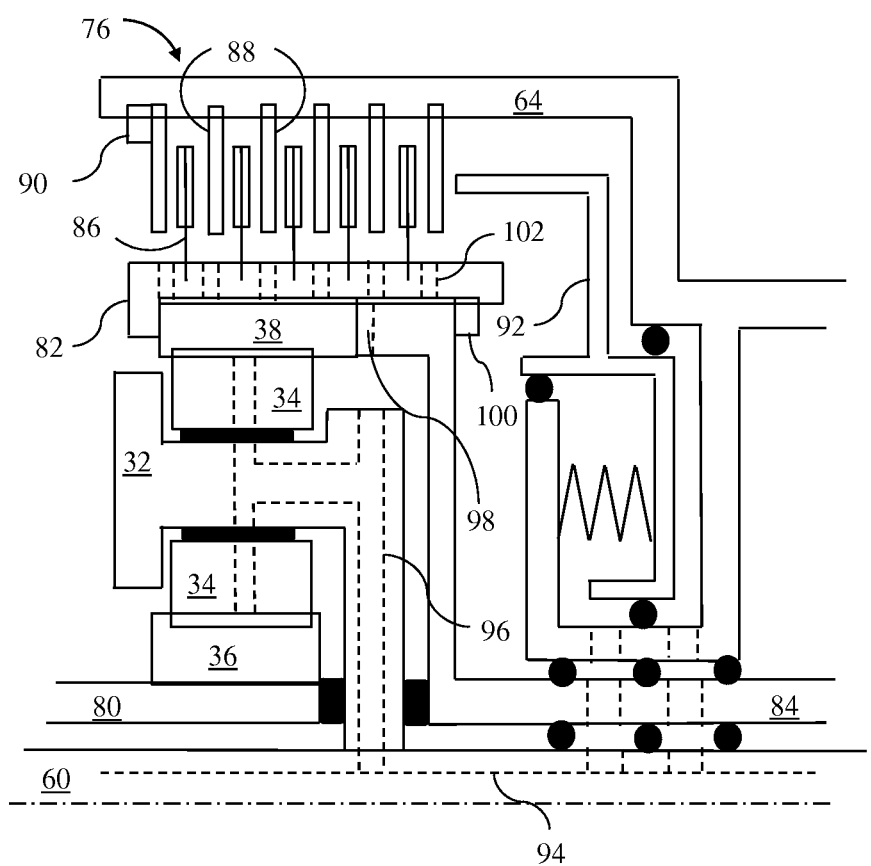
FIG. 2 is a cross section of a portion of a transmission according to the kinematic arrangement of FIG. 1.

FIG. 2 is a cross section showing gear set 30 and clutch 76 in more detail. Carrier 32 is splined to input shaft 60. Planet gear 34 is supported for rotation with respect to carrier 32 by roller bearings. Sun gear 36 is splined to shaft 80 which couples it to sun gear 26. Clutch hub 82 is splined to both ring gear 38 and shaft 84 which is coupled to sun gear 46. A plurality of friction plates 86 are splined to clutch hub 82 and interleaved with a plurality of separator plates 88 splined to intermediate shaft 64. The leftmost separator plate, which is called a reaction plate, is constrained axially by snap ring 90. Piston 92 slides axially with respect to intermediate shaft 64 in response to fluid pressure to squeeze friction plates 86 between separator plates 88.

Fluid is supplied for a variety of purposes through various axial channels 94 in input shaft 10. One of these channels conveys fluid at low pressure for lubrication and heat removal. The lubrication channel in the input shaft supplies fluid to an axial channel 96 in carrier 32. Some of this fluid is conveyed to the roller bearings and then through the planet gears 34 to lubricate the meshing interfaces with sun gear 36 and ring gear 38. The remainder of this fluid continues flowing radially to the cavity created by ring gear 38 and shaft 84. Alternatively, the fluid may flow into this cavity through the thrust bearings separating shaft 80, carrier 32, and shaft 84. In the alternative configuration, some of the fluid may be captured as it flows radially and diverted to lubricate the planetary gears. From the cavity, the fluid flows radially through channel 98 to the inner surface of clutch hub 82. Channel 98 may be formed into shaft 84 or may be defined by the interface between ring gear 38 and shaft 84. From channel 98, the fluid flows axially through one or more axial channels formed by the spline interfaces between clutch hub 82 and ring gear 38 and shaft 84. The flow toward the left is contained by a lip formed into the end of clutch hub 82. The flow toward the right is contained by snap ring 100. From the axial channels, the fluid flows through radial channels 102 in clutch hub 82 and into clutch pack. As the fluid flows radially through the clutch pack, it absorbs heat and controls the friction properties to improve controllability during shifts. The axial channels permit fluid flow to reach friction plates that are located directly over the ring gear 38 without any need to drill holes in ring gear 38.

Figure 3:
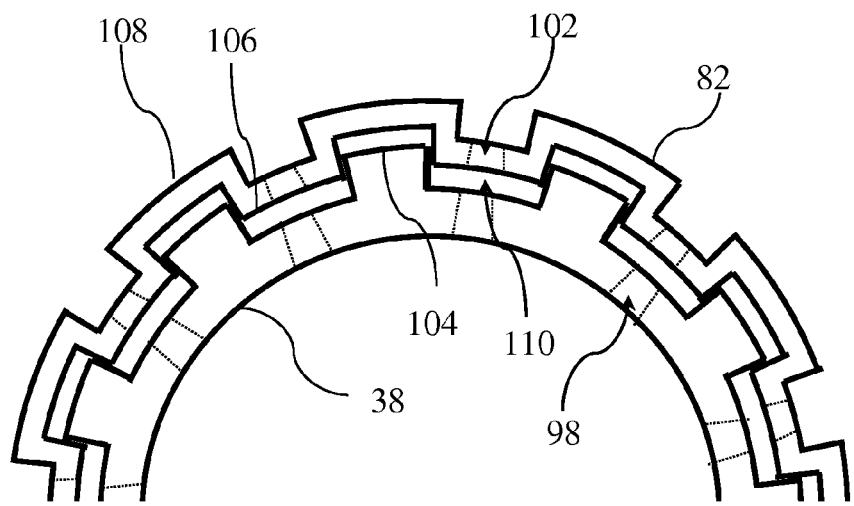
FIG. 3 is an end view of a first embodiment of a ring gear and clutch hub in the transmission of FIG. 2.

FIG. 3 is an end view of one embodiment of clutch hub 82 and ring gear 38. Ring gear 38 has a number of external spline teeth 104 that mesh with internal spline teeth 106 of clutch hub 82. Clutch hub 82 also has a number of external spline teeth 108 that mesh with friction plates 86. The inner diameter of the clutch hub internal spline teeth 106 is greater than the inner diameter of the ring gear external spline teeth 104 defining a gap 110. The gap 110 is an axial channel conducting fluid from radial channels 98 to radial channels 102. The number of radial channels 102 at a given axial location can be equal to the number of spline teeth providing excellent distribution of the fluid across the surfaces of the friction plates.

Figure 4:
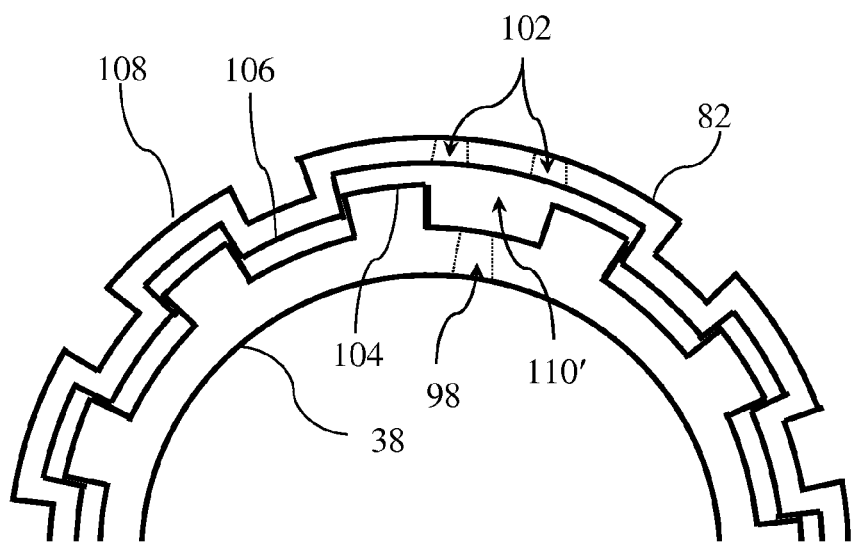
FIG. 4 is an end view of a second embodiment of a ring gear and clutch hub in the transmission of FIG. 2.

FIG. 4 is an end view of another embodiment of clutch hub 82 and ring gear 38. In this embodiment, one of the internal spline teeth of clutch hub 82 is omitted, forming an axial channel 110' which is significantly larger than the axial channels of FIG. 3. Several internal spline teeth may be omitted around the perimeter of ring gear 38 to form a number of such large axial channels. A similar effect can be achieved by omitting ring gear spline teeth. These larger channels are capable of transferring fluid a higher flow rates than the channels of FIG. 3. However, the number of radial channels 102 is reduced, so the groove pattern of friction plates 86 and relative rotation between friction plates 86 and separator plates 88 is more important to distribute the fluid. The two approaches may be used in combination.

In addition to the packaging advantages of being able to position the clutch pack over the ring gear, this arrangement offers manufacturing cost advantages. The clutch hub can be formed easily from sheet metal. The ring gear, on the other hand is typically formed using more expensive processing including heat treated for hardness.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
 a planetary gearset ring gear having spline teeth;
 a clutch hub having internal and external spline teeth, the internal spline teeth engaging the ring gear spline teeth to define a plurality of axial fluid distribution channels, the clutch hub further defining radial channels extending outwardly from the axial channels; and
 a plurality of friction plates engaging the external spline teeth and axially aligned with the ring gear.

2. The transmission of claim 1 wherein the clutch hub is closed on one end defining an end of the axial fluid distribution channels.

3. The transmission of claim 1 further comprising a snap ring inserted into the clutch hub defining an end of the axial fluid distribution channels.

4. The transmission of claim 1 further comprising a shaft having spline teeth engaging the internal spline teeth of the clutch hub.

5. The transmission of claim 4 wherein the ring gear and the shaft define a radial fluid flow channel extending inwardly from the axial channels.

6. The transmission of claim 1 wherein the axial channels are defined between an inner diameter of the ring gear spline teeth and an outer diameter of the clutch hub internal spline teeth.

7. The transmission of claim 1 wherein a number of ring gear spline teeth exceeds a number of clutch hub internal spline teeth to define axial fluid flow channels between adjacent ring gear spline teeth.

8. A clutch hub having external spline teeth configured to engage friction plates and having internal spline teeth configured to engage a ring gear, the clutch hub defining a plurality of radial channels extending from between the internal spline teeth to an outer surface to distribute fluid to the friction plates from gaps between the ring gear and the internal spline teeth.

9. A transmission comprising:
 a first rotating element having a first set of external spline teeth;
 a second rotating element having a second set of external spline teeth;

a clutch hub having internal spline teeth engaging the first and second sets of external spline teeth and having a third set of external spline teeth; and a plurality of friction plates engaging the third set of external spline teeth.

10. The transmission of claim 9 wherein the internal spline teeth and the first set of external spline teeth define axial fluid distribution channels and wherein the clutch hub defines a number of radial fluid distribution channels to conduct fluid from the axial distribution channels to the friction plates.

11. The transmission of claim 10 wherein the axial channels are formed by radial gaps between the internal spline teeth and the first rotating component.

12. The transmission of claim 10 wherein the axial channels are formed by circumferential gaps due to an unequal number of internal spline teeth and external spline teeth.

13. The transmission of claim 10 wherein the friction plates are axially aligned with the first rotating element.

* * * * *